US006466795B1

United States Patent
Ahn

(10) Patent No.: US 6,466,795 B1
(45) Date of Patent: Oct. 15, 2002

(54) METHOD FOR IMPROVING RESOURCE ALLOCATION IN A WIRELESS COMMUNICATIONS SYSTEM USING BROADCAST RESOURCE INFORMATION

(75) Inventor: Yong-cheol Ahn, Anyang (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/378,706

(22) Filed: Aug. 23, 1999

(30) Foreign Application Priority Data

Aug. 21, 1998 (KR) ............................................. 98-33868

(51) Int. Cl.[7] ................................................. H04Q 7/22
(52) U.S. Cl. ....................................... 455/450; 455/525
(58) Field of Search ................................. 455/450, 451, 455/452, 453, 436, 437, 438, 439, 524, 525

(56) References Cited

U.S. PATENT DOCUMENTS

| 5,434,798 | A | * | 7/1995 | Madebrink et al. ...... 455/423 X |
| 5,548,809 | A | | 8/1996 | Lemson ...................... 455/34.1 |
| 5,574,977 | A | | 11/1996 | Joseph et al. ............... 455/58.1 |
| 5,687,171 | A | | 11/1997 | Shin et al. ................... 370/335 |
| 5,729,542 | A | * | 3/1998 | Dupont .................... 455/513 X |
| 5,740,533 | A | | 4/1998 | Lin ............................. 455/432 |
| 5,862,130 | A | * | 1/1999 | Tat et al. ................. 455/450 X |

FOREIGN PATENT DOCUMENTS

| EP | 0734191 A1 | 9/1996 | ............ H04Q/7/20 |
| GB | 2277849 A | 11/1994 | ............ H04Q/7/04 |
| GB | 2297013 A | 7/1996 | ............ H04Q/7/38 |
| GB | 2329556 A | 3/1999 | ............ H04Q/7/38 |
| JP | 4-286432 | 10/1992 | ............ H04B/7/26 |
| JP | 8-168070 | 6/1996 | ............ H04Q/7/22 |
| JP | 8-223638 | 8/1996 | ............ H04Q/7/36 |
| JP | 9-307939 | 11/1997 | ............ H04Q/7/22 |
| JP | 10-28284 | 1/1998 | ............ H04Q/7/36 |
| WO | WO 96/08938 | 3/1996 | ............ H04Q/7/38 |

* cited by examiner

*Primary Examiner*—Lee Nguyen
*Assistant Examiner*—Philip J. Sobutka
(74) *Attorney, Agent, or Firm*—Sughrue Mion, PLLC

(57) ABSTRACT

A resource allocation request method in a wireless system, including base stations and terminals, includes the steps of: periodically broadcasting resource information, managed by the base stations, to the terminals; receiving and storing the periodically-broadcast resource information in the terminals; making a determination, in response to a resource allocation request, by comparing the parameter value of a resource, extracted from the stored resource information, with a preset critical value when a terminal receives an application command corresponding to the resource allocation request from a user; and, variably requesting resource allocation of the base stations according to the determinations by the terminals in response to the resource allocation requests.

5 Claims, 4 Drawing Sheets

(a)                (b)

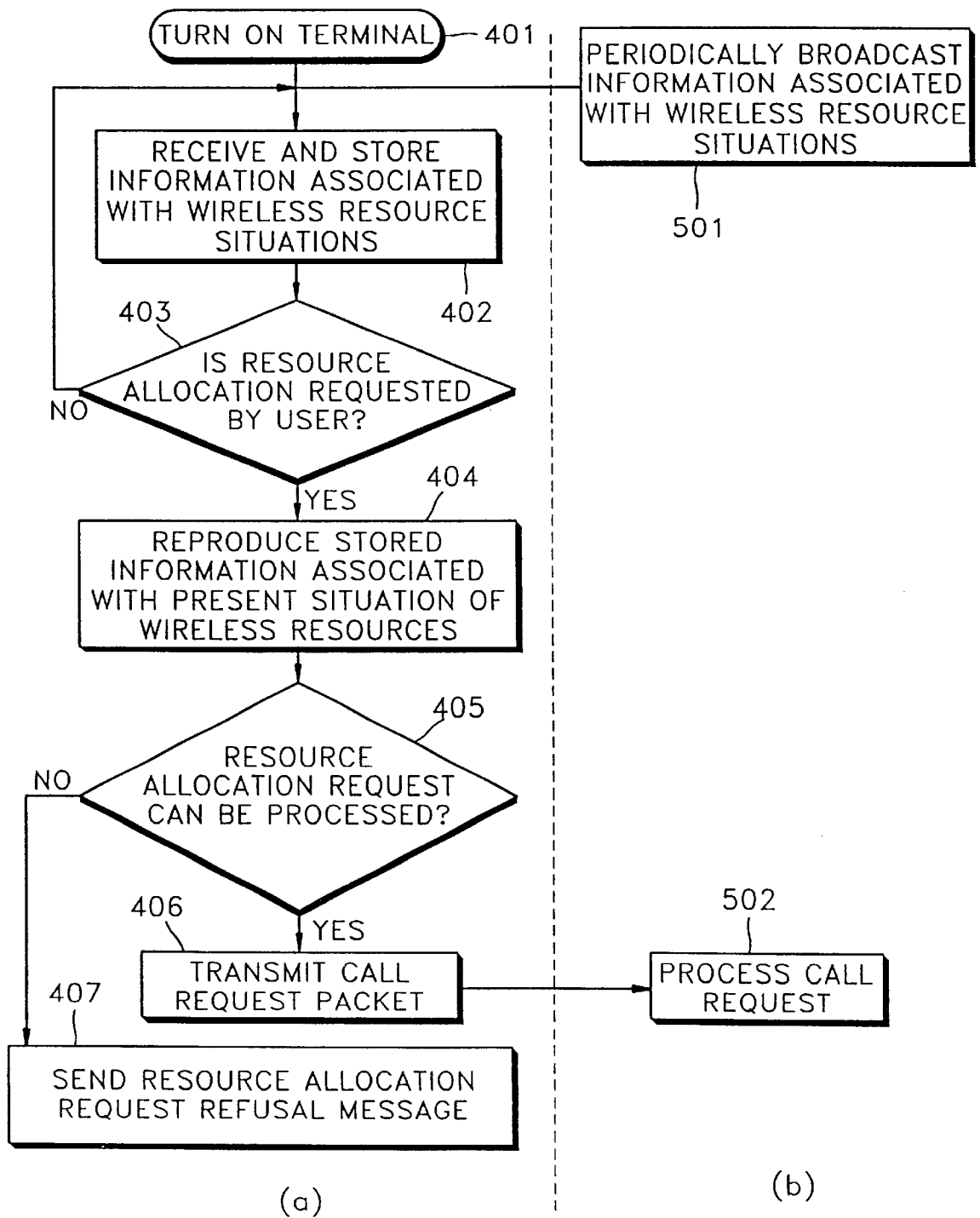

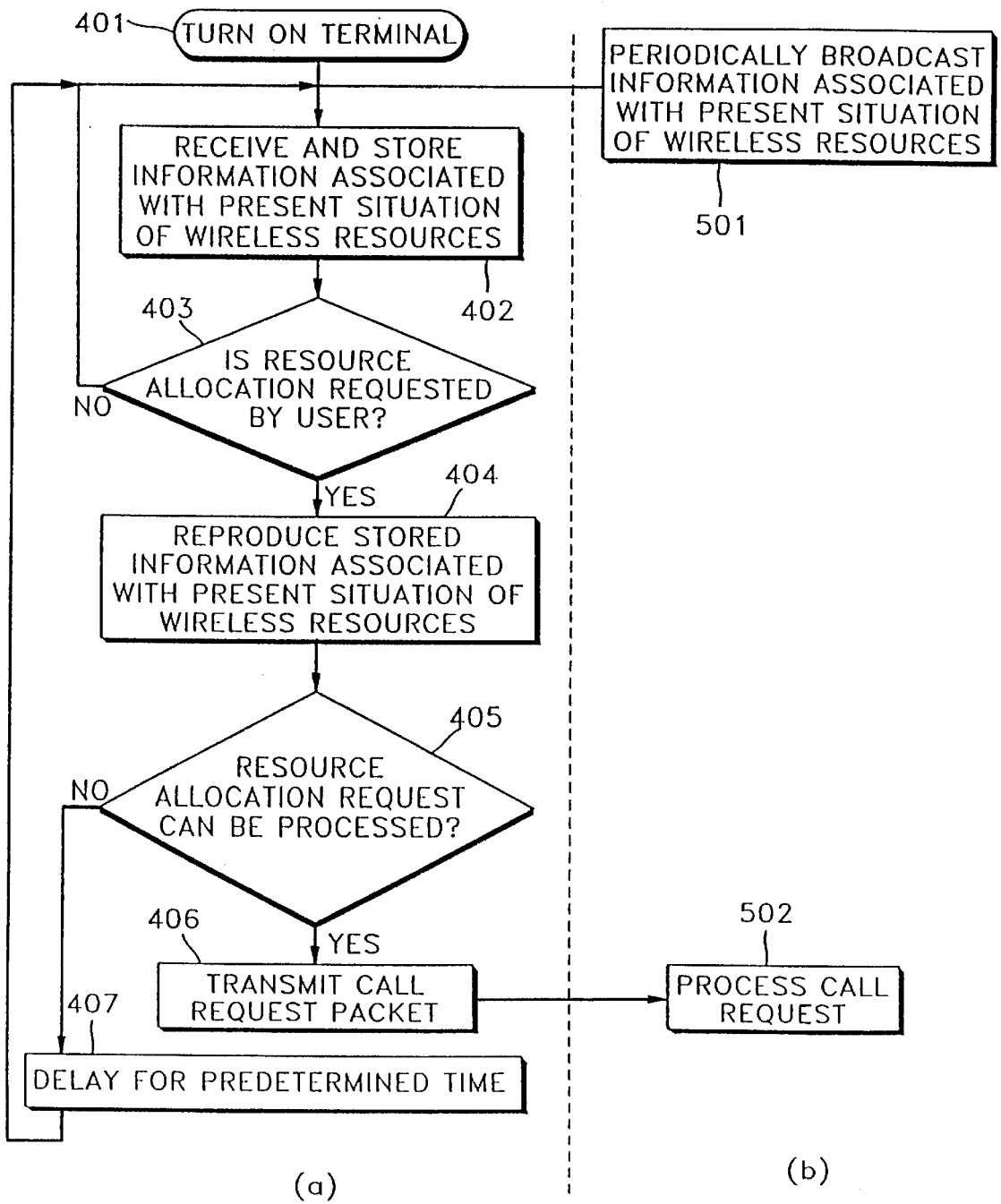

METHOD FOR IMPROVING RESOURCE ALLOCATION IN A WIRELESS COMMUNICATIONS SYSTEM USING BROADCAST RESOURCE INFORMATION

BACKGROUND OF THE INVENTION

1. Field of the Invention

The present invention relates to a resource allocation method of a wireless communications system, and more particularly, to an efficient resource allocation request method in a wireless system comprising a base station and a plurality of terminals.

2. Description of the Related Art

Wireless communications systems have been developed into a second-generation system, a third-generation IMT 2000 system, and a fourth-generation wireless asynchronous transfer mode (ATM) system, etc.

As shown in FIG. 1, a wireless communications network manager segments a service area into cells and operates base stations 40 and 60 so that subscriber terminals 41, 42, 43, 55, 61, and 62 can use a given wireless frequency resource.

The subscriber terminals 41, 42, 43, 55, 61, and 62 in the service area request the base stations 40 and 60 to allocate the resource. The base stations 40 and 60 must allocate the resource so that as many subscribers as possible can communicate with high quality.

A frequency resource is allocated differently according to the particular communications system. That is, a specific carrier frequency is allocated to each of the subscribers in a cell in a frequency division multiple access (FDMA) system, a specific time slot for a carrier frequency is allocated to each of the subscribers in a time division multiplex access (TDMA) system, and a specific code is allocated to each of the subscribers in a code division multiple access (CDMA) system.

The wireless communications system requests resource allocation in various situations. For example, when a cellular subscriber makes a telephone call or transmits a file, resource allocation is requested, and when a subscriber 55 on the telephone using an already-allocated resource moves from a specific cell to another cell, allocation of a new resource is requested to prevent the conversion from being interrupted. When the subscriber moves to a cell controlled by an adjacent base station while talking on the phone, a subscriber's terminal receives a strong signal from the adjacent base station and generates handoff.

In particular, in a CDMA cellular system using the same frequency band between cells, when a terminal moves to an adjacent cell, handoff is generated in an area where a strong signal is received from the adjacent cell.

A method of effectively allocating a resource in this wireless communications system has been disclosed in "Congestion Control System and Method For Efficient Multi-frequency Messaging" by J. H. Lin et al. (U.S. Pat. No. 5,740,533), and "System and Method For Providing Priority Access and Channel Assignment In a Cellular Telecommunication System" by R. S. Joseph et al. (U.S. Pat. No. 5,574,977).

When several terminals request resource allocation from a base station at the same time, the probability that occurences of a collision between the requests of terminals increases. Therefore, a resource allocation request algorithm and a method of solving the problem of collision have been proposed in standards such as group special mobile (GSM), IS-95, and IEEE802.11, among others.

Referring to FIG. 2, when a terminal (a) in step 202 receives an application command such as a command for making a telephone call or for transmitting a file, corresponding to a resource allocation request from a user, a call request packet is transmitted to a wireless base station (b) in step 203. Then, the wireless base station (b) inspects a parameter of the received call request packet in step 302, and a decision of whether resource allocation will be made is made in step 303. Here, the wireless base station (b) performs a resource allocation decision algorithm and sends a message indicating failure or success of resource allocation to the terminal (a). The terminal (a) initiates a communications service when a message indicating successful resource allocation is received from the wireless base station (b), in steps 204 and 205.

However, even by applying these wireless resource allocation standards, several terminals requiring resource allocation may perform a resource allocation request simultaneously without information associated with the present conditions of a resource.

Thus, the requests of these terminals are highly likely to collide with one another. Even if no collision occurs, there may not be wireless resources that can be allocated to terminals. As a consequence, resources cannot be effectively utilized.

SUMMARY OF THE INVENTION

To solve the above problem, it is an objective of the present invention to provide an efficient wireless resource allocation method in which a base station broadcasts all resource information being used in a cell controlled by the base station, and terminals variably request the base station to allocate resources according to the resource information, in a wireless communications system.

Accordingly, to achieve the above objective, there is provided a resource allocation request method in a wireless communications system including a plurality of base stations and a plurality of terminals, the method comprising the steps of: periodically broadcasting resource information managed by the base stations to the terminals; receiving and storing the periodically-broadcast resource information in the terminals; making a determination in response to a resource allocation request by comparing a parameter value of a resource, extracted from the stored resource information, with a preset critical value when a terminal receives an application command corresponding to a resource allocation request from a user; and variably requesting resource allocation of the base stations according to the determination of the terminals in response to the resource allocation request.

BRIEF DESCRIPTION OF THE DRAWINGS

The above objective and advantage of the present invention will become more apparent by describing in detail preferred embodiments thereof, with reference to the attached drawings in which:

FIG. 3 is a flowchart illustrating a method of allocating a resource between a terminal and a base station according to a first embodiment of the present invention; and FIG. 4 is a flowchart illustrating a method of allocating a resource between a terminal and a base station according to a second embodiment of the present invention.

DESCRIPTION OF THE PREFERRED EMBODIMENTS

Figure 1:
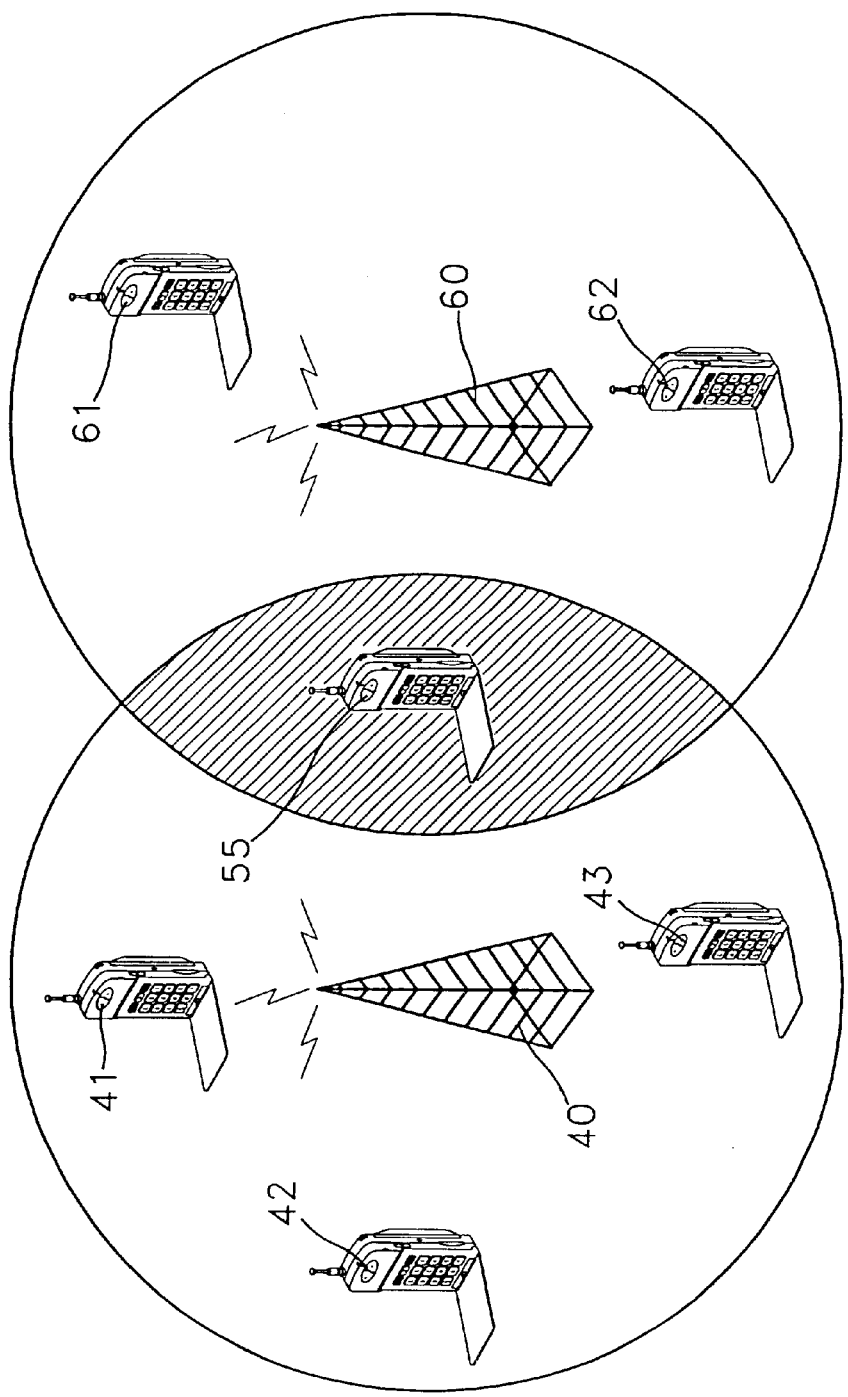
FIG. 1 is a conceptual diagram illustrating a general wireless communications system.
Figure 2:
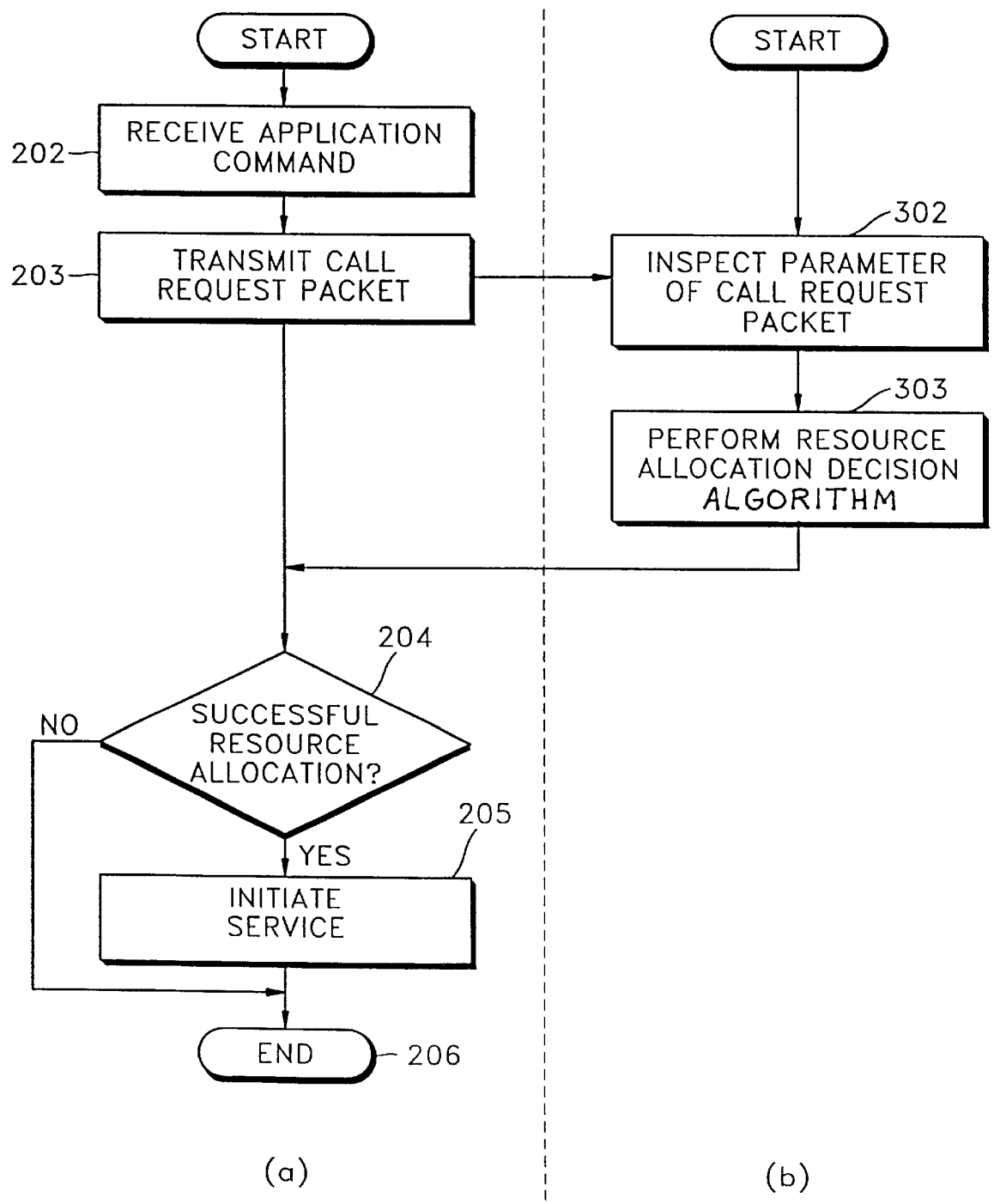
FIG. 2 is a flowchart illustrating a conventional method of allocating a resource between a terminal and a base station.

A method of allocating a resource between a terminal and a base station, according to a first embodiment of the present invention, will now be described in reference to the flowchart of FIG. 3.

First, a base station (b) periodically broadcasts resource information being used in a cell to a public network, in step 501. A terminal (a) receives the resource information broadcast by the base station (b) and stores it in a memory (not shown), in step 402.

Here, the resource information broadcasted by the base station (b) can include frequency, time slot, and pseudo noise (PN) code information, etc. Alternatively, the resource information broadcasted by the base station (b) can include the number of previously-allocated traffic channels and the number of non-allocated traffic channels among the total number of traffic channels.

In a next step 404, when the terminal (a) receives an application command such as a command for making a telephone call or for transmitting a file, corresponding to a resource allocation request from a user in step 403, resource information stored in a memory is read. Then, the terminal (a) determines whether a call request packet will be transmitted to the base station (b) by performing a resource allocation request decision algorithm on the basis of the resource information read from the memory, in step 405.

In a preferred embodiment, the resource allocation request decision algorithm is an operation process in which the terminal (a) compares parameter values extracted from the resource information with preset critical values. Here, the critical values of a normal call and a handoff call can be different.

In step 405, if the parameter values extracted from the resource information are smaller than the critical values, it is determined that the base station (b) is capable of processing a call request. The call request packet is then transmitted to the base station (b) in step 406. On the other hand, if the parameter values extracted from the resource information are greater than or equal to the critical values, it is determined that the base station (b) is incapable of processing the call request, in step 405. A user is then informed of any resource problem by a resource allocation refusal message in step 407.

When the base station (b) receives the call request packet from the terminal (a), in step 502, it performs a typical resource allocation decision algorithm and sends a message that informs a user of failure or success of resource allocation to the terminal (a).

FIG. 4 is a flowchart illustrating a method of allocating a resource between a terminal and a base station according to a second embodiment of the present invention.

The terminal (a) performs a resource allocation request decision algorithm using reproduced resource information. If it is determined in step 405 that the base station (b) has the capability of processing a call request, a call request packet is transmitted to the base station (b), in step 406. Otherwise, the algorithm is delayed for a predetermined time in step 407, and the resource allocation request decision algorithm is repeatedly performed, in step 405. Here, the terminal (a) receives newly-broadcasted resource information from the base station (b), and the algorithm is then delayed for a predetermined time to perform an allocation request determining algorithm on the basis of the received resource information, in step 405. Also, the terminal (a) can set the delay time to be slightly longer than the transmission period of resource information broadcast by the base station (b).

The present invention is not limited to the above-described embodiments, and it is apparent that various modifications may be effected by those skilled in the art within the spirit of the present invention. That is, a base station used in the present invention can be one among a GSM, an IS-95, an IMT2060, and a wireless ATM system. The contents of broadcasting information and the determination standard for a resource allocation request can be different for each system.

According to the present invention as described above, a terminal makes a determination for a resource allocation request using resource information received from a base station, thus reducing the probability of collision between the requests of base stations due to their synchronous resource allocation requests and increasing the usability of the entire wireless resources.

What is claimed is:

1. A resource allocation request method in a wireless communications system including a plurality of base stations and a plurality of terminals, the method comprising the steps of:

periodically broadcasting resource information managed by the base stations to the terminals;

receiving and storing the periodically-broadcast resource information in the terminals;

determining, in response to a resource allocation request, whether the request can be processed, by comparing a parameter value of a resource, extracted from the stored resource information, with a preset critical value when a terminal of the plurality of terminals receives an application command, corresponding to the resource allocation request, from a user;

variably requesting resource allocation of the base stations according to the determination of the terminal in response to the resource allocation request; and wherein when the resource allocation request cannot be processed, the terminal predetermines whether the resource allocation request can be processed, after a predetermined delay time, said predetermined delay time is longer than a transmission period of resource information broadcast by a base station of the plurality of base stations.

2. A resource allocation method as claimed in claim 1, wherein the resource information includes a present status of frequency use information, time slot information, and PN code information.

3. A resource allocation method as claimed in claim 1, wherein a base station of the plurality of base stations is one selected from the group consisting of a GSM base station, an IS-95 base station, an IMT2000 base station, and a wireless ATM base station.

4. A resource allocation method as claimed in claim 1, wherein the determination by the terminal of whether a resource allocation request can be processed is made by comparing a parameter value of the received resource information and a preset critical value.

5. A resource allocation method as claimed in claim 1, wherein the resource information broadcast by a base station of the plurality of base stations to the terminal includes a number of traffic channels pre-allocated by the base station, and a number of non-allocated channels among a total number of traffic channels.

\* \* \* \* \*